US011108731B2

(12) United States Patent
Su et al.

(10) Patent No.: US 11,108,731 B2
(45) Date of Patent: Aug. 31, 2021

(54) SYSTEM AND METHOD FOR GENERATING A UNIFIED ADDRESS BOOK

(71) Applicant: Toshiba TEC Kabushiki Kaisha, Shinagawa-ku (JP)

(72) Inventors: William Su, Riverside, CA (US); Michael Yeung, Mission Viejo, CA (US); Christopher Nguyen, Huntington Beach, CA (US)

(73) Assignee: Toshiba TEC Kabushiki Kaisha, Shinagawa-ku (JP)

( * ) Notice: Subject to any disclaimer, the term of this patent is extended or adjusted under 35 U.S.C. 154(b) by 41 days.

(21) Appl. No.: 16/553,741

(22) Filed: Aug. 28, 2019

(65) Prior Publication Data

US 2021/0067481 A1 Mar. 4, 2021

(51) Int. Cl.
*H04L 29/12* (2006.01)
*H04W 4/16* (2009.01)
*H04L 12/58* (2006.01)
*H04W 8/26* (2009.01)

(52) U.S. Cl.
CPC ............ *H04L 61/157* (2013.01); *H04L 51/28* (2013.01); *H04L 61/1576* (2013.01); *H04L 61/1594* (2013.01); *H04W 4/16* (2013.01); *H04W 8/26* (2013.01)

(58) Field of Classification Search
CPC ... H04L 51/28; H04L 61/157; H04L 61/1576; H04L 61/1594; H04N 1/00; H04N 1/00209; H04N 1/32545; H04N 2201/0094; H04W 4/16; H04W 8/26
See application file for complete search history.

(56) References Cited

U.S. PATENT DOCUMENTS

| 6,744,936 B2* | 6/2004 | Irons | H04N 1/00127 382/306 |
| 7,324,711 B2* | 1/2008 | Nagarajan | G06K 9/00449 375/E7.2 |
| 7,701,602 B2* | 4/2010 | Burke | G06F 3/1268 358/1.15 |
| 7,788,272 B2* | 8/2010 | Ray | G06F 21/10 707/758 |
| 7,804,823 B2* | 9/2010 | Toscano | H04N 1/00217 370/356 |

(Continued)

FOREIGN PATENT DOCUMENTS

| AU | 2002341874 A1 * | 5/2003 | ......... H04N 1/00127 |
| CN | 1602486 A * | 3/2005 | ......... H04N 1/00334 |

(Continued)

*Primary Examiner* — Eric Nowlin
(74) *Attorney, Agent, or Firm* — Ulmer & Berne LLP

(57) ABSTRACT

A system and method for generating a unified address book includes a processor, a network interface and a memory storing an address book. The address book is comprised of an electronic address records in a preset or preexisting data record format. Each electronic address record of the address is scanned to generate address records to form a unified address book where records are stored in a unified address format. Generated address records are communicated to an associated data device via the network interface. Additional address records are received from the network interface and the unified address book is supplemented with additional received address records.

20 Claims, 4 Drawing Sheets

(56) References Cited

U.S. PATENT DOCUMENTS

| | | | | |
|---|---|---|---|---|
| 7,813,595 B2* | 10/2010 | Nagarajan | ........... | G06K 9/00463 382/305 |
| 7,933,587 B1* | 4/2011 | Swan | ................. | H04M 3/4931 455/412.1 |
| 8,116,303 B2* | 2/2012 | Toscano | ............ | H04N 1/00214 370/356 |
| 8,281,984 B2* | 10/2012 | Shenfield | .......... | H04L 29/12047 235/375 |
| 8,395,795 B2* | 3/2013 | Toscano | ............... | H04L 51/066 358/1.15 |
| 8,451,473 B2* | 5/2013 | Hong | ................... | G06K 15/402 358/1.14 |
| 8,587,808 B2* | 11/2013 | Ding | ................. | H04N 1/32074 358/1.15 |
| 8,787,616 B2* | 7/2014 | Irons | .................. | H04N 1/32133 382/101 |
| 8,804,159 B2* | 8/2014 | Mori | ................. | H04N 1/00244 358/1.14 |
| 8,896,869 B2* | 11/2014 | Toscano | ............. | H04N 1/00212 358/1.15 |
| 9,191,527 B2* | 11/2015 | Toscano | ............... | H04L 51/066 |
| 9,311,038 B2* | 4/2016 | Park | ....................... | G06F 3/1206 |
| 9,557,940 B2* | 1/2017 | Shintani | ................ | G06F 3/1205 |
| 9,602,683 B2* | 3/2017 | Park | ....................... | G06F 3/1203 |
| 9,661,160 B2* | 5/2017 | Park | ..................... | H04N 1/00307 |
| 10,298,685 B1 | 5/2019 | Amansahedov | .... | H04L 61/1594 |
| 10,496,861 B2* | 12/2019 | Rothschild | ............ | G06T 11/001 |
| 10,814,661 B2* | 10/2020 | Rothschild | ......... | G06K 9/00161 |
| 10,834,279 B1* | 11/2020 | Jensen | ............... | H04N 1/00488 |
| 2002/0111960 A1* | 8/2002 | Irons | ................. | H04N 1/00326 |
| 2006/0072830 A1* | 4/2006 | Nagarajan | .......... | G06K 9/00463 382/224 |
| 2006/0146372 A1* | 7/2006 | Bair | ..................... | H04N 1/2179 358/403 |
| 2008/0033916 A1* | 2/2008 | Ray | ........................ | G06F 21/10 |
| 2008/0055669 A1* | 3/2008 | Nagarajan | .......... | G06K 9/00449 358/462 |
| 2009/0055644 A1* | 2/2009 | Miyamoto | ......... | H04N 1/00127 713/162 |
| 2009/0067414 A1* | 3/2009 | Toscano | ............. | H04N 1/00212 370/353 |
| 2009/0067418 A1* | 3/2009 | Toscano | ............. | H04L 51/066 370/357 |
| 2009/0122339 A1* | 5/2009 | Nakamura | ........ | H04M 1/27457 358/1.15 |
| 2010/0266163 A1* | 10/2010 | Evevsky | ................ | G06K 9/036 382/112 |
| 2010/0315683 A1* | 12/2010 | Toscano | ............. | H04N 1/00212 358/1.15 |
| 2011/0089229 A1* | 4/2011 | Shenfield | .......... | H04L 29/12047 235/375 |
| 2011/0149352 A1* | 6/2011 | Ding | ................... | H04N 1/32374 358/474 |
| 2011/0293135 A1* | 12/2011 | Irons | ................... | H04N 1/32133 382/101 |
| 2012/0102142 A1* | 4/2012 | Chopra | ............... | H04L 43/0817 709/217 |
| 2013/0148797 A1* | 6/2013 | Toscano | ............. | H04N 1/00214 379/100.08 |
| 2015/0055180 A1* | 2/2015 | Toscano | ............... | H04N 1/0022 358/1.15 |
| 2015/0092233 A1* | 4/2015 | Park | ................... | H04N 1/00307 358/1.15 |
| 2016/0112584 A1* | 4/2016 | Park | ...................... | G06F 3/1206 358/1.15 |
| 2016/0112585 A1* | 4/2016 | Park | ...................... | G06F 3/1222 358/1.15 |
| 2016/0188264 A1* | 6/2016 | Shintani | ................ | G06F 3/1263 358/1.15 |
| 2016/0188580 A1* | 6/2016 | Tecu | ....................... | G06F 16/93 707/760 |
| 2016/0316100 A1* | 10/2016 | Hwang | ................ | H04W 12/08 |
| 2018/0013912 A1* | 1/2018 | Melo | .................. | H04N 1/00344 |
| 2018/0129844 A1* | 5/2018 | Rothschild | .......... | G06K 7/10722 |
| 2018/0154676 A1* | 6/2018 | Rothschild | ......... | G06K 9/00483 |

FOREIGN PATENT DOCUMENTS

| | | | | |
|---|---|---|---|---|
| CN | 101453502 A | * | 6/2009 | ........ H04M 1/27457 |
| CN | 1602486 B | * | 5/2010 | ......... H04N 1/32128 |
| CN | 101453502 B | * | 2/2013 | ............. G06Q 10/10 |
| EP | 1451717 A1 | * | 9/2004 | ......... H04N 1/00244 |
| EP | 1451717 A4 | * | 12/2005 | ......... H04N 1/00244 |
| EP | 2188958 A2 | * | 5/2010 | ............... H04N 1/32 |
| EP | 2335403 A2 | * | 6/2011 | ......... H04N 1/00212 |
| EP | 2335403 A4 | * | 8/2011 | ......... H04N 1/00212 |
| EP | 2188958 A4 | * | 12/2011 | ............. H04N 1/32 |
| JP | 4395797 B2 | * | 1/2010 | ......... H04N 1/32101 |
| JP | 4535118 B2 | * | 9/2010 | ............. G06Q 10/10 |
| JP | 5203651 B2 | * | 6/2013 | ............. G06F 21/10 |
| KR | 20150037384 A | | 4/2015 | |
| WO | WO-03036515 A1 | * | 5/2003 | ............. G06F 16/93 |
| WO | WO-2009032872 A2 | * | 3/2009 | ............. H04L 51/08 |
| WO | WO-2009032872 A3 | * | 5/2009 | ......... H04N 1/00212 |
| WO | WO-2010030601 A2 | * | 3/2010 | ......... H04N 1/00212 |
| WO | WO-2010030601 A3 | * | 2/2011 | ......... H04N 1/00244 |
| WO | WO-2011150270 A1 | * | 12/2011 | ......... H04N 1/32133 |

* cited by examiner

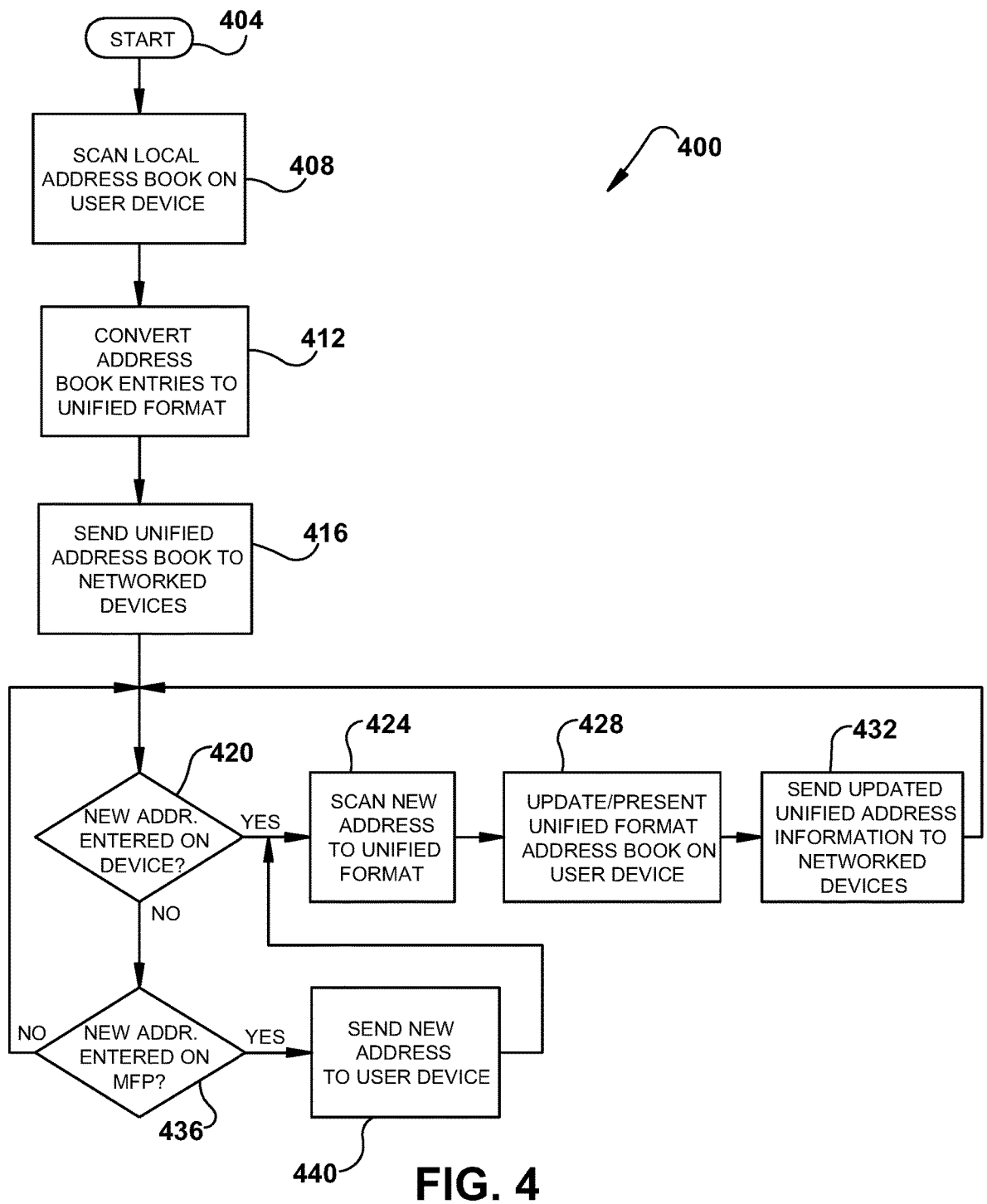

SYSTEM AND METHOD FOR GENERATING A UNIFIED ADDRESS BOOK

TECHNICAL FIELD

This application relates generally to creating and maintaining a contact address book. The application relates more particularly to creating a unified address book that is maintained and shared among different devices in a unified address format.

BACKGROUND

Document processing devices include printers, copiers, scanners and e-mail gateways. More recently, devices employing two or more of these functions are found in office environments. These devices are referred to as multifunction peripherals (MFPs) or multifunction devices (MFDs). As used herein, MFPs are understood to comprise printers, alone or in combination with other of the afore-noted functions. It is further understood that any suitable document processing device can be used.

MFPs can include an address book of contacts, such as names, addresses, e-mail addresses, phone numbers, and the like. Users often carry portable data devices, such as smartphones, tablet computers or notebook computers. Users may have address books stored natively on their devices. Entries from an address book on an MFP may not coincide with entries on a user device address book.

BRIEF DESCRIPTION OF THE DRAWINGS

Various embodiments will become better understood with regard to the following description, appended claims and accompanying drawings wherein:

FIG. 4 is an example embodiment of a scan to email based unified address book system.

DETAILED DESCRIPTION

Figure 1:
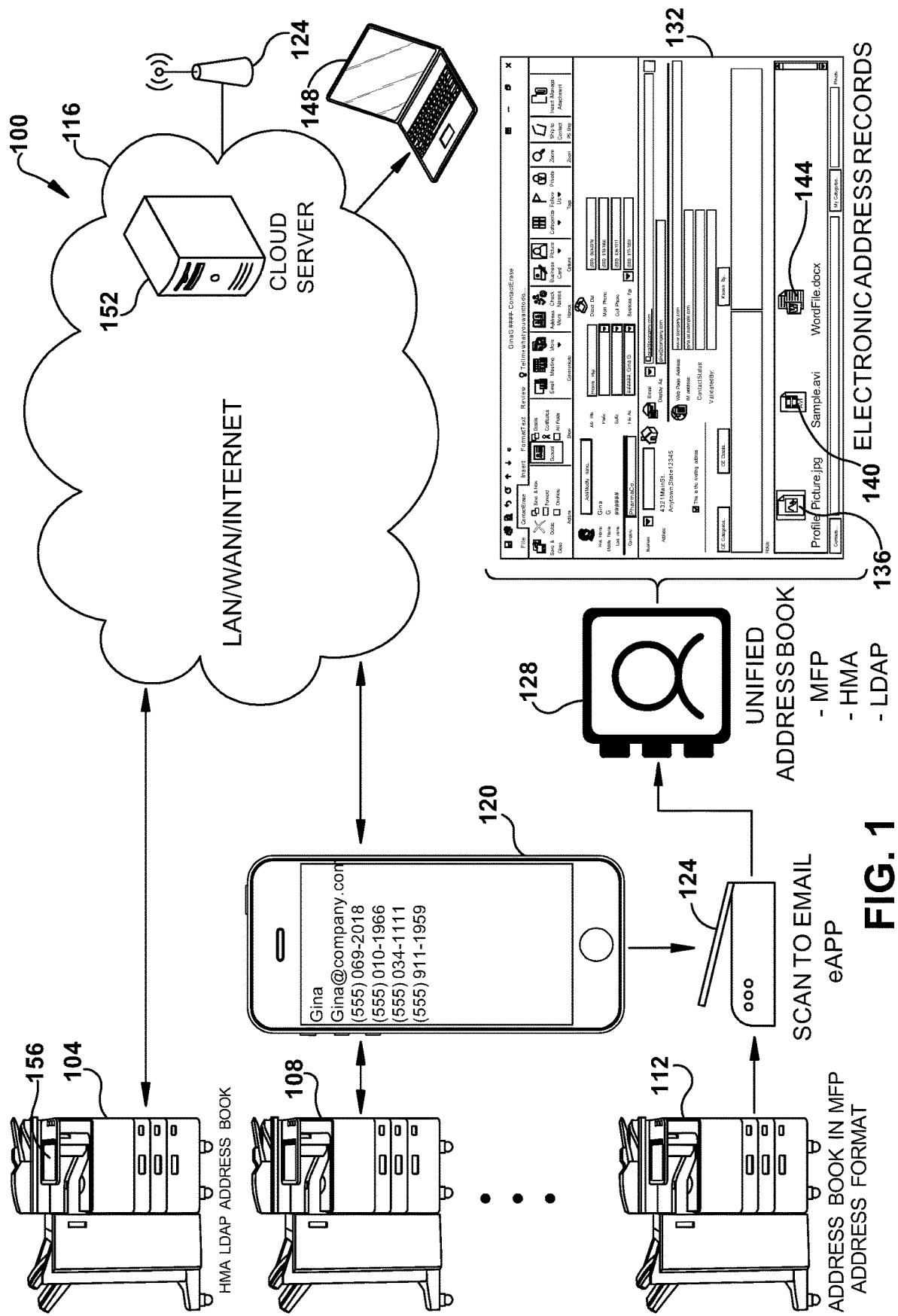
FIG. 1 is an example embodiment of a scan to email system for updating and distributing a unified format address book.

The systems and methods disclosed herein are described in detail by way of examples and with reference to the figures. It will be appreciated that modifications to disclosed and described examples, arrangements, configurations, components, elements, apparatuses, devices methods, systems, etc. can suitably be made and may be desired for a specific application. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such.

MFPs can process electronic documents into tangible documents, or scan tangible documents into electronic documents. MFPs can also e-mail or fax electronic documents to one or more destinations. A typical MFP can be operated by a user present at the MFP's user interface where they can direct a scan operation, print operation, copy operation, fax operation or email operation. A user can also send a document processing job to an MFP from a remote location, such as networked workstation. MFP operation can also be integrated to work with a mobile device, such as a smartphone, tablet computer or a notebook computer. An electronic application (eApp) suitably integrates a user's device with MFP operation. A particular example is Toshiba TEC's e-Bridge Print & Capture eApp.

e-BRIDGE Print & Capture is an application that allows one to print and scan from MFPs, such as TOSHIBA e-STUDIO MFPs utilizing a personal Android device. Suitably integrated with TOSHIBA e-BRIDGE Re-Rite OCR software, e-BRIDGE Print & Capture allows one to convert scanned images or photo documents into one of 22 editable file formats including Microsoft Word, Excel, and PowerPoint files. The eApp allows one to:

Print documents (JPEG/PDF) from cloud storage services (Box, Dropbox, Google Drive, OneDrive, Evernote) or a network folder through e-STUDIO MFPs or shared printer;

Print images stored in Android or captured by the device's camera;

Print web pages and emails with Android print services;

Utilize advanced MFP print settings such as number of copies, duplex, color mode (BW/Color/Twin Color), Print Mode (Normal/Private/Hold/Multi-Station), Paper Type, Paper Size, Staple, Omit Blank Pages and Toner Save;

Scan documents from an e-STUDIO MFP and save them onto a portable device, a network folder, upload it to a cloud storage service, or send by e-mail;

Convert scanned images or photo documents to an editable format such as searchable PDF, Microsoft Word, Excel or PowerPoint by using suitable software such as TOSHIBA e-BRIDGE Re-Rite OCR software or with an OCR function within the MFP;

e-STUDIO MFPs can be discovered via scanning the QR code printed from e-BRIDGE Print & Capture with the scanner on e-BRIDGE Print & Capture or by searching through your history of the most recently used MFPs; or NFC features can be used by tapping the pre-configured Android for Mobile Authentication and Connection Handover.

In example embodiments herein, a scan to eApp supports different kinds of address books such as an integrated MFP address book, a historical manual address book (HMA) or an Lightweight Directory Access Protocol (LDAP) address book. An HMA is comprised of a local address book for manually inputted email addresses. LDAP is a software protocol suitable for enabling one to locate organizations, individuals, and other resources such as files and devices in a network, whether on the public Internet or on a corporate intranet. As used herein, an address book or a contact list and addresses or contacts, can be used interchangeably.

Example embodiments here allow a user to have contacts available no matter which MFP that user is using. Users are also enabled to make changes, additions and deletions on one MFP that appear on all other MFPs. A Scan to Email eApp transfers contacts, thumbnails attached to contacts, photos, videos, music, call logs, SMS, MMS, and documents from the user's mobile phone to an MFP and creates a unified book. The system can present address entries to the user at the time of scanning. A user's address book is suitably bound with the user's mobile phone address book to create a unified book and that is presented to the user at the time of scanning. A user's contacts are suitably centralized in a dedicated address book.

A particular example embodiment relative to the forgoing includes a processor, a network interface and a memory storing an address book. The address book is comprised of an electronic address records in a preset or preexisting data record format. Each electronic address record of the address is scanned to generate address records to form a unified address book where records are stored in a unified address format. Generated address records are communicated to an associated data device via the network interface. Additional address records are received from the network interface and the unified address book is supplemented with additional received address records.

In accordance with the subject application, FIG. 1 illustrates an example embodiment of a scan to e-mail system 100 for updating and distributing a unified format address book. Included are one or MFPs such as MFPs 104, 108 and 112. The MFPs are in network data communication via network cloud 116 comprised of any suitable network, including a local area network (LAN), a wide area network (WAN), which may comprise the Internet, or any suitable combination thereof. A portable data device, illustrated as smartphone 120 is in data communication with the MFPs by any suitable means, such as wirelessly through Wi-Fi hotspot 124 so as to contact network cloud 116.

Smartphone 120 includes a scan to email eApp, illustrated as eApp 124. The user device also stores a unified address book which is formed from one or more different address book formats, such as MFP, HMA or LDAP as noted above. Any suitable electronic file format can be used including but not limited to a preset data record format from which a conversion to a unified address format is made. Unified address book 128 includes a plurality of address records, such as electronic address record 132. Address records may include photos, such as profile picture 136, sound, video or other multimedia files, such as multimedia file 140, or character or text files, such as word processing file 144. Any suitable file can be scanned into a unified address format record, including SMS messages, MMS messages, music, video, call logs, and the like. Exporting a user's smartphone call log can be particularly advantageous when it is then available on multiple devices.

In the illustrated example, a unified format address list is shared among networked devices, including MFPs 104, 108 and 112, smartphone 120, laptop computer 148, and also suitably a copy on server, such as cloud server 152.

A contact list, or address book, contains important details about people with whom a user interacts with online and in real life. It is beneficial to have contacts available no matter which MFP or device a user chooses to use. In the illustrated example, when a user makes changes, additions or deletions on one device, such as on an MFP or smartphone 120, the unified address book is supplemented with the changes and they appear on all other MFPs, as well as the user's device. If a user enters an address on an MFP user interface, such as user interface 156 of MFP 104, the contact information is relayed to scan to e-mail app 124 and converted for updating unified address book 128. The updated information is suitably circulated to the other networked devices. A cloud server such as cloud server 152 is suitably used for access from other locations. Other suitable cloud servers include services such as iCloud, Google Contacts, and Exchange servers, all of which can provide near instantaneous push updates from one device to others. It may also be desirable to have a unified address book stored solely on MFPs themselves in situations such as wherein a user is not comfortable with the contacts being stored online. In such situations, a user may use the Scan to Email eApp 124 that synchronizes contacts locally or over a private network.

In another example, a user may have a paper document, such as a letter, which includes address information. In this situation, a user may scan the document and the MFP suitably extracts any embedded contact information and commences an update to the unified address book as detailed above.

Figure 2:
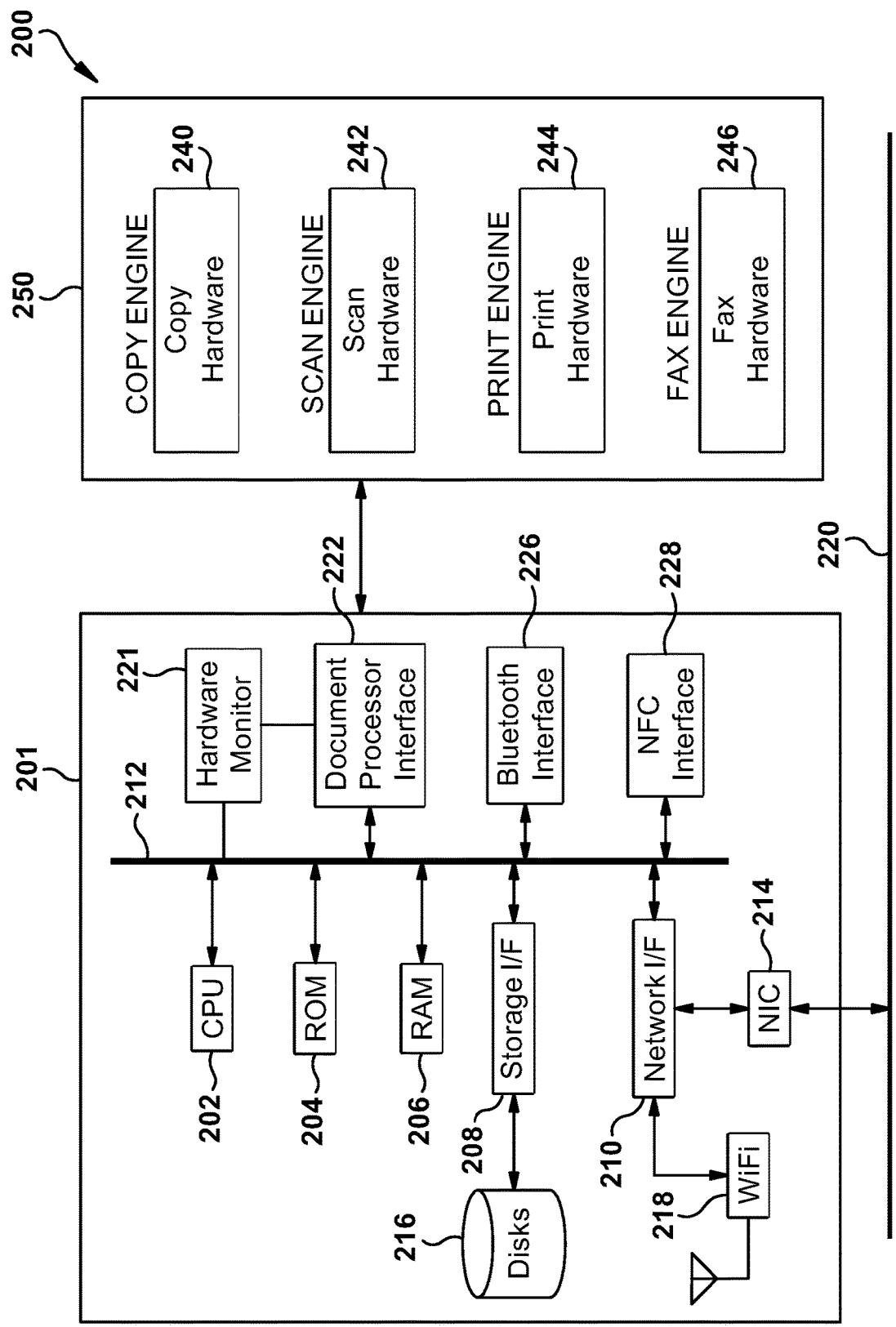
FIG. 2 is an example embodiment of a networked digital device such as a multifunction peripheral.

Turning now to FIG. 2 illustrated is an example embodiment of a networked digital device comprised of document rendering system 200 suitably comprised within an MFP, such as with MFPs 104, 108 and 112 of FIG. 1. It will be appreciated that an MFP includes an intelligent controller 201 which is itself a computer system. Included in controller 201 are one or more processors, such as that illustrated by processor 202. Each processor is suitably associated with non-volatile memory, such as read only memory (ROM) 204, and random access memory (RAM) 206, via a data bus 212.

Processor 202 is also in data communication with a storage interface 208 for reading or writing data with storage 216, suitably comprised of a hard disk, optical disk, solid-state disk, cloud-based storage, or any other suitable data storage as will be appreciated by one of ordinary skill in the art.

Processor 202 is also in data communication with a network interface 210 which provides an interface to a network interface controller (NIC) 214, which in turn provides a data path to any suitable wired or physical network connection 220, or to a wireless data connection via a wireless network interface, such as WiFi 218. Example wireless connections include cellular, Wi-Fi, wireless universal serial bus (wireless USB), satellite, and the like. Example wired interfaces include Ethernet, USB, IEEE 1394 (FireWire), Lightning, telephone line, or the like. Processor 202 is also in data communication with a hardware monitor 221, suitably amassing state data from subassemblies, sensors, digital thermometers, or the like, and suitably including digital state date including device codes, such as device error codes. Processor 202 can also be in data communication a document processor interface 222, with BLUETOOTH interface 226 and NFC interface 228 via data path 212.

Processor 202 can also be in data communication with any suitable user input/output (I/O) interface (not shown) which provides data communication with user peripherals, such as displays, keyboards, mice, track balls, touch screens, or the like.

Document processor interface 222 is suitable for data communication with MFP functional units 250. In the illustrate example, these units include a copy engine, suitably comprised of copy hardware 240, a scan engine, suitably comprised of scan hardware 242, a print engine, suitably comprised of print hardware 244 and a fax engine, suitably comprised of fax hardware 246. These subsystems together comprise MFP functional hardware 250. It will be understood that functional units are suitably comprised of intelligent units, including any suitable hardware or software platform.

Figure 3:
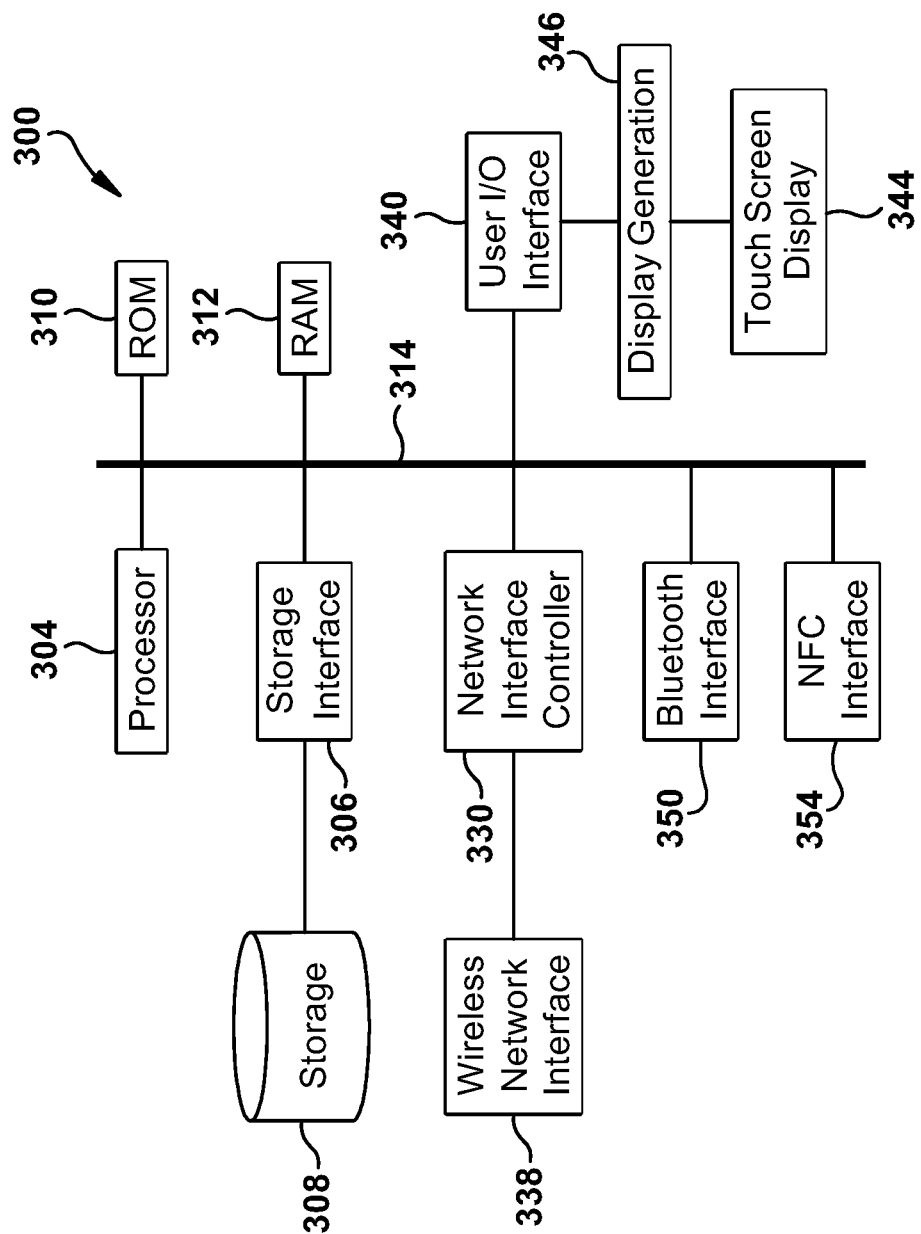
FIG. 3 is an example embodiment of a digital device system such as a smartphone or tablet computer.

Turning now to FIG. 3, illustrated is an example of a digital device system 300 suitably comprising smartphone 120, laptop 148, or cloud server 152 of FIG. 1. Included are one or more processors, such as that illustrated by processor 304. Each processor is suitably associated with non-volatile memory, such as read only memory (ROM) 310 and random access memory (RAM) 312, via a data bus 314.

Processor 304 is also in data communication with a storage interface 306 for reading or writing to a data storage system 308, suitably comprised of a hard disk, optical disk, solid-state disk, or any other suitable data storage as will be appreciated by one of ordinary skill in the art.

Processor 304 is also in data communication with a network interface controller (NIC) 330, which provides a data path to any suitable network or device connection, such as a suitable wireless data connection via wireless interface 338. A suitable data connection to an MFP or server is via a data network, such as a local area network (LAN), a wide arear network (WAN), which may comprise the Internet, or any suitable combination thereof. A digital data connection is also suitably directly with an MFP or server, such as via BLUETOOTH, optical data transfer, Wi-Fi direct, or the like.

Processor 304 is also in data communication with a user input/output (I/O) interface 340 which provides data communication with user peripherals, such as touch screen display 344 via display generator 346, as well as keyboards, mice, track balls, touch screens, or the like. It will be understood that functional units are suitably comprised of intelligent units, including any suitable hardware or software platform.

Network interface 338 suitably provides wireless data communication via Wi-Fi interface 347, Bluetooth interface 348 and NFC interface 349. Also in data communication with processor 304 is camera 350, microphone 354 and fingerprint sensor 360.

FIG. 4 is a flowchart 400 of an example embodiment of a scan to email based unified address book system. The process commences at block 404 and proceeds to block 408 where a scan is made of a user's address book on their device. The scan to email eApp converts entries, including any file attachments, to a unified format at block 412. This unified address book is communicated to other network devise at block 416. If a new address is entered on the user device at block 420, it is scanned at block 424, and the unified address book is updated and presented on the user device at block 428. Updated unified address information is sent to other networked devices at block 432 and the process returns to block 420. If no new address is entered on the user's device at block 420, a check is made as to whether new address information is entered on an MFP at block 436. If so, the new address information is sent to the user device at block 440, and the process proceeds to block 424. If no new address information is entered on an MFP, the process returns to block 420.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the spirit and scope of the inventions.

What is claimed is:

1. A system comprising:
a processor;
a network interface; and
a memory storing a first address book comprised of a plurality of electronic address records in first preset data record format,
the memory storing a second address book comprised of a plurality of electronic address records in a second preset data record format,
wherein the processor is operable to scan each electronic address record of the first and second plurality of electronic address records to generate unified address records comprising a unified address book wherein records are stored in a unified address format,
wherein the processor is further operable to communicate generated unified address records to an associated data device via the network interface,
wherein the processor is further operable to receive additional unified address records in the unified address format via the network interface, and
wherein the processor is further operable to supplement the unified address book with additional received unified address records.

2. The system of claim 1 wherein at least one data record is associated with an image, and wherein the processor is further operable to scan the image into a unified address record including the scanned image.

3. The system of claim 2 wherein at least one data record is comprised of a multimedia message service message encoding audio or video data.

4. The system of claim 2 wherein at least one data record is associated with an electronic document including characters.

5. The system of claim 4 wherein the at least one data record further comprises a call log.

6. The system of claim 1 wherein the processor is further operable to scan received additional address records in a second data record format to convert them into the unified address format.

7. The system of claim 1 wherein the system is comprised of a mobile phone and wherein the unified address book is associated with a user of the mobile phone.

8. A method comprising:
storing, in a memory, a first address book comprised of a plurality of electronic address records in a first preset data record format;
storing, in the memory, a second address book combined of a plurality of electronic address records in a second preset data record format;
scanning, via a processor, each electronic address record of the first and second plurality of electronic address records to generate unified address records comprising a unified address book wherein records are stored in a unified address format;
communicating generated unified address records to an associated data device via the network interface;
receiving additional unified address records in the unified address format via the network interface; and
supplementing the unified address book with additional received unified address records.

9. The method of claim 8 wherein at least one data record is associated with an image, and further comprising scanning the image into a unified address record including the scanned image.

10. The method of claim 9 wherein the at least one data record is comprised of a multimedia message service message encoding audio or video data.

11. The method of claim 9 wherein at least one data record is associated with an electronic document including characters.

12. The method of claim 11 wherein the at least one data record further comprises a call log.

13. The method of claim 8 further comprising scanning received additional address records in a second data record format to convert them into the unified address format.

14. The method of claim 8 wherein the processor and memory comprise a mobile phone and wherein the unified address book is associated with a user of the mobile phone.

15. A system comprising:
first and second networked multifunction peripherals, each multifunction peripheral including an address book associated with a user, the address book being comprised of a plurality of unified address records; and
a portable data device associated with a user, the portable data device including
a processor,
a memory storing a local address book including a plurality of address records associated with a user of the portable data device in a plurality of different data record formats, and
a data interface,
wherein the processor is operable to scan the address records to generate corresponding unified address book records in a unified address format, and
wherein the processor is further operable to communicate generated records of the unified address book to the multifunction peripherals via the data interface.

16. The system of claim 15 wherein the first multifunction peripheral includes:
an intelligent controller;
a network interface; and
a user interface operable to receive address input from the user, and
wherein the controller is operable to communicate a new address record associated with received address input to the portable data device.

17. The system of claim 15 wherein the data interface is operable to receive the new address record,
wherein the processor is further operable to scan the new address record to generate a corresponding new unified address record, and
wherein the processor is further operable to add the new unified address record to the unified address book to form an updated address book.

18. The system of claim 17 wherein the processor is further operable to communicate data of the updated address book to the multifunction peripherals via the data interface.

19. The system of claim 18 wherein one or more of the address records includes one or more electronic data files.

20. The system of claim 19 wherein the one or more electronic data files each includes one or more of an electronic image, a text message, a multimedia file or a call log.

* * * * *